United States Patent [19]

Suda et al.

[11] Patent Number: 4,859,842
[45] Date of Patent: Aug. 22, 1989

[54] MULTI-DIRECTIONAL FOCUS STATE DETECTION APPARATUS

[75] Inventors: Yasuo Suda, Yokohama; Ichiro Ohnuki, Tokyo; Akira Akashi; Akira Ishizaki, both of Yokohama; Keiji Ohtaka; Takeshi Koyama, both of Tokyo, all of Japan

[73] Assignee: Canon Kabushiki Kaisha, Tokyo, Japan

[21] Appl. No.: 313,343

[22] Filed: Feb. 21, 1989

Related U.S. Application Data

[63] Continuation of Ser. No. 919,506, Oct. 16, 1986, abandoned.

[30] Foreign Application Priority Data

Oct. 22, 1985 [JP] Japan .................................. 60-235822
Dec. 12, 1985 [JP] Japan .................................. 60-280591
Jan. 27, 1986 [JP] Japan .................................. 61-15278

[51] Int. Cl.$^4$ .............................................. G01J 1/20
[52] U.S. Cl. .................................. 250/201; 250/204; 354/408
[58] Field of Search .................. 250/201 PF, 204; 354/408; 356/1, 4

[56] References Cited

U.S. PATENT DOCUMENTS

| | | |
|---|---|---|
| 3,781,110 | 12/1973 | Leitz . |
| 4,110,042 | 8/1978 | Leitz .................................. 356/4 |
| 4,296,316 | 10/1981 | Tsuji et al. .......................... 250/204 |
| 4,373,791 | 2/1983 | Araki . |
| 4,543,476 | 9/1985 | Horikawa . |
| 4,560,863 | 12/1985 | Matsumura et al. ......... 250/201 PF |
| 4,602,153 | 7/1986 | Suzuki ................................. 250/201 |

FOREIGN PATENT DOCUMENTS

| | | |
|---|---|---|
| 0069938 | 1/1983 | European Pat. Off. . |
| 3317090 | 11/1983 | Fed. Rep. of Germany . |
| 3417385 | 11/1984 | Fed. Rep. of Germany . |
| 58-49844 | 8/1983 | Japan . |
| 1555527 | 11/1979 | United Kingdom . |
| 1576160 | 10/1980 | United Kingdom . |
| 1578679 | 11/1980 | United Kingdom . |
| 1578937 | 11/1980 | United Kingdom . |

Primary Examiner—Edward P. Westin
Assistant Examiner—Khaled Shami
Attorney, Agent, or Firm—Fitzpatrick, Cella, Harper & Scinto

[57] ABSTRACT

A focus detection apparatus includes:
a first optical device for forming light distributions, associated with an object image, whose relative positional relationship chnages along a first direction in accordance with a focusing state of the objective lens;
a second optical device for forming light distributions, associated with the object image, whose relative positional relationship changes along a second direction in accordance with the focusing state of the objective lens;
a first sensing unit, having a plurality of photosensors, for forming an electrical signal associated with the focusing state of the objective lens in order to sense the light distributions formed by the first optical device; and
a second sensing unit, having a plurality of photosensors, for forming an electrical signal associated with the focusing state of the objective lens in order to sense the light distribution formed by the second optical device.

34 Claims, 12 Drawing Sheets

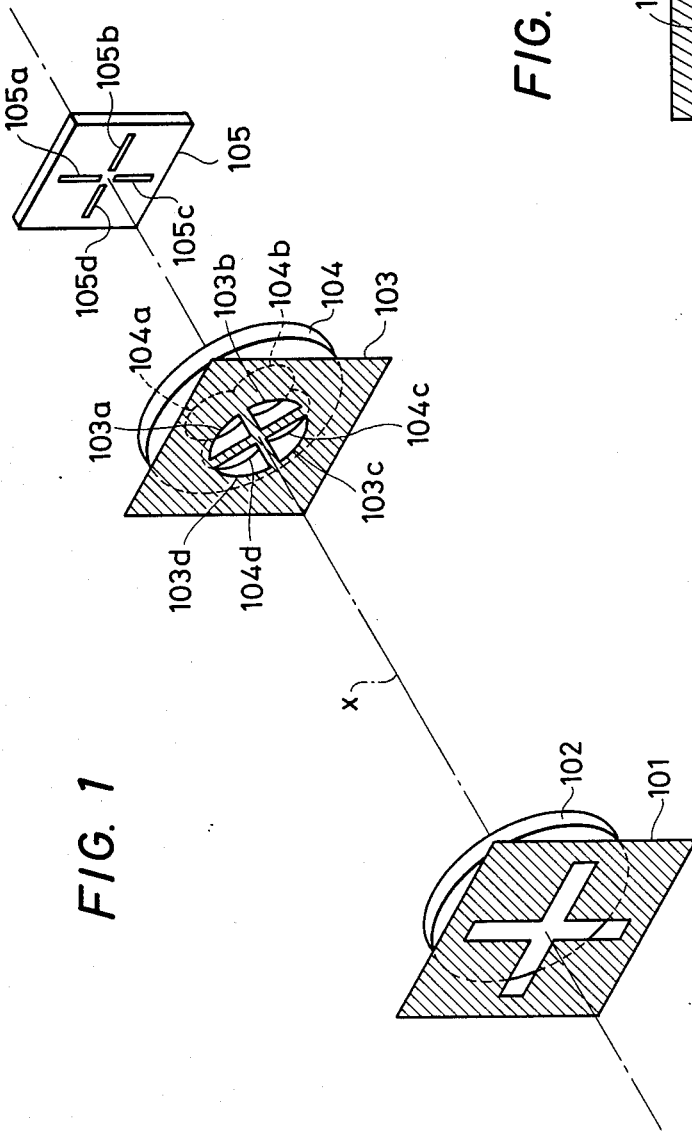
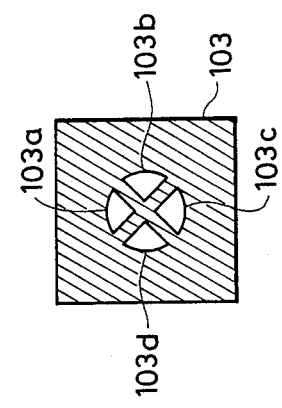

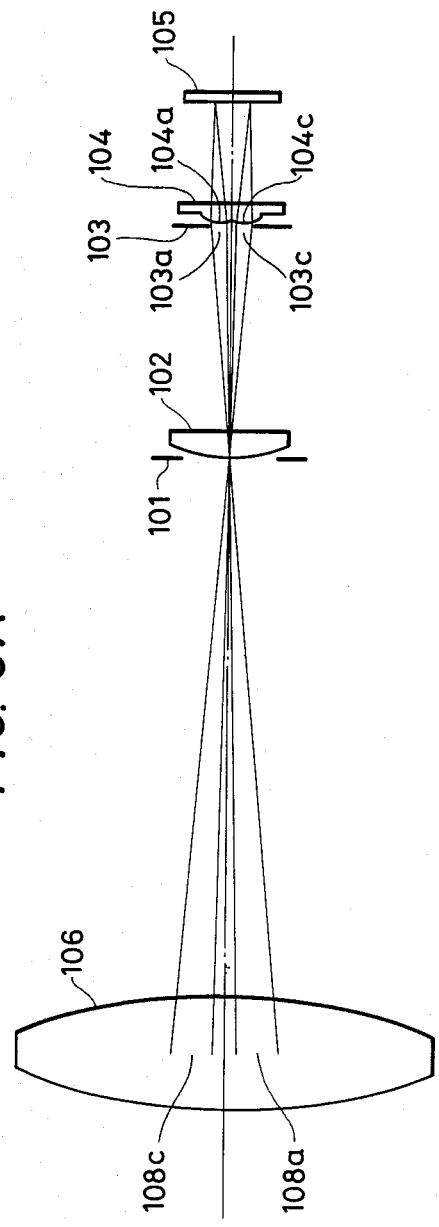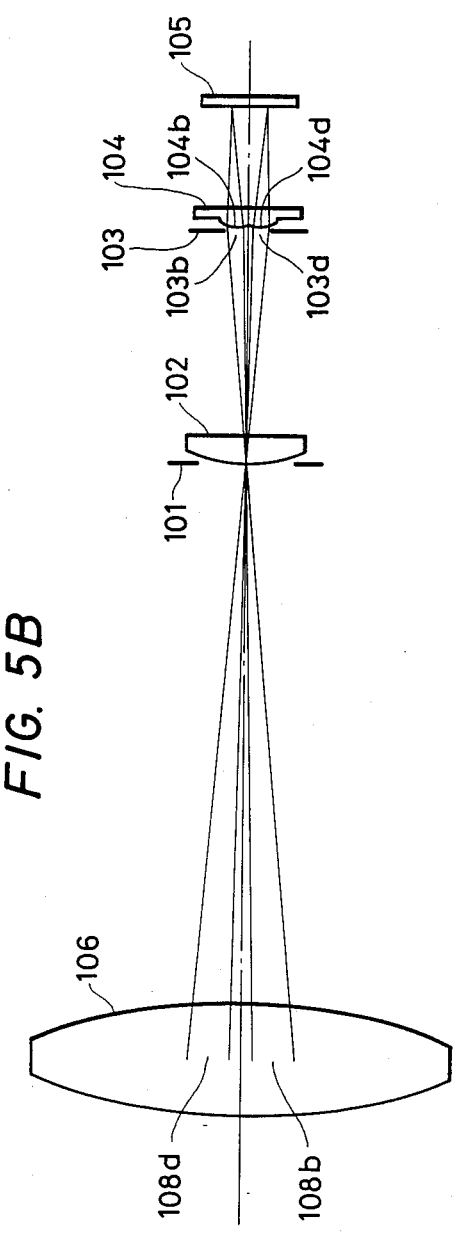

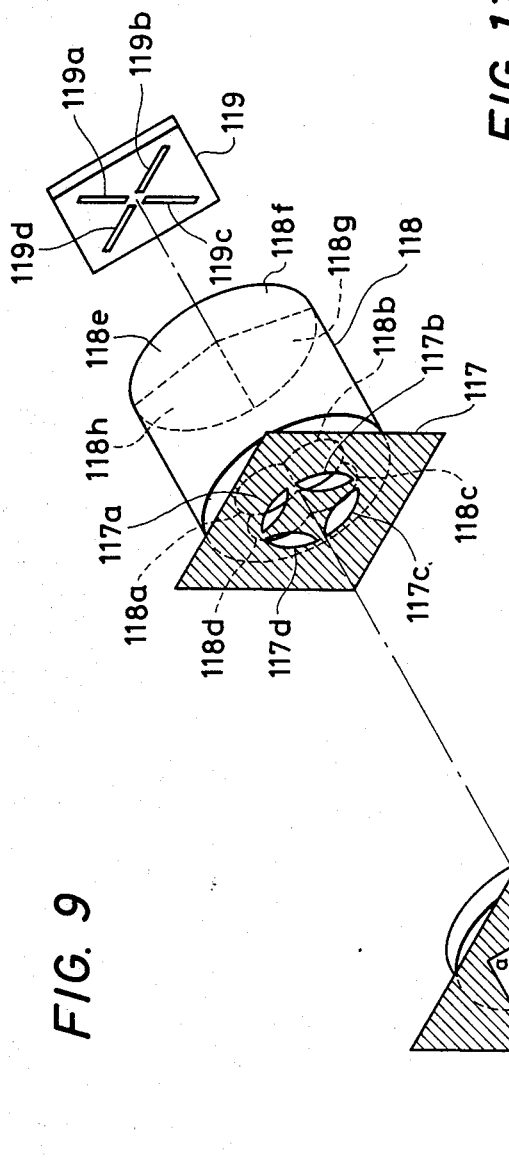
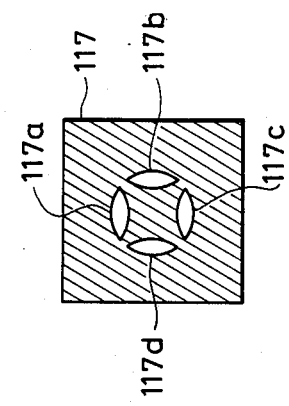
FIG. 9
FIG. 11

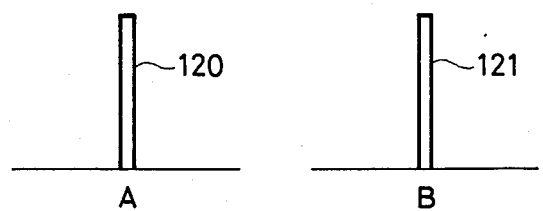
FIG. 13A
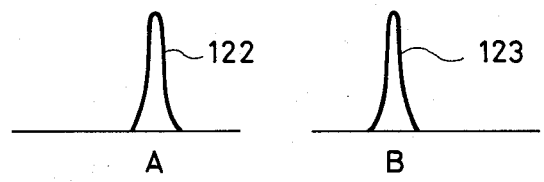
FIG. 13B
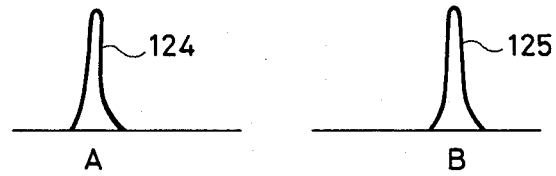
FIG. 13C
FIG. 14
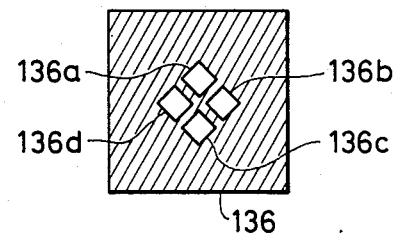

ial image focused by the imaging lens on pixel arrays
MULTI-DIRECTIONAL FOCUS STATE DETECTION APPARATUS This application is a continuation of application Ser. No. 919,506 filed Oct. 16, 1986 now abandoned.

BACKGROUND OF THE INVENTION

1. Field of the Invention

The present invention relates to a focus detection apparatus for detecting a focusing state of an objective lens in accordance with light or energy distribution of an object and, more particularly, to an apparatus for detecting a focusing state in accordance with light distributions in a plurality of directions.

2. Related Background Art

A conventional passive type automatic focus detection apparatus detects a defocusing amount of a focusing lens from a light distribution in a specific direction of an object, as described in Japanese Patent Application Laid-open No. 150918/1983, and the like. Therefore, focus detection is disabled with respect to an object which has no light distribution in a direction which allows the focus detection apparatus to perform focus detection. For example, a passive type focus detection apparatus of a camera normally has a detection capability with respect to a light distribution only in the vertical direction. Therefore, it is difficult for an apparatus to focus on an object which has a repetitive stripe pattern, e.g., a sweater having a lateral stripe pattern at equal intervals or a blind of a window.

SUMMARY OF THE INVENTION

It is an object of the present invention to provide a focus detection apparatus which is free from the above drawbacks and capable of detecting a focusing state of a focusing lens regardless of the outer appearance or the pattern of an object.

BRIEF DESCRIPTION OF THE DRAWINGS

FIG. 1 is a perspective view of a focus detection apparatus according to an embodiment of the present invention;

FIG. 2 is a plan view of a stop;

FIGS. 5A and 5B are sectional views of the focus detection apparatus;

FIG. 9 is a perspective view of a focus detection apparatus according to another embodiment of the present invention;

FIG. 11 is a plan view of a stop;

FIGS. 13A to 13C are views showing sensor outputs corresponding to a just-in-focus state of the objective lens;

FIG. 14 is a plan view showing a modification of a stop;

DETAILED DESCRIPTION OF THE PREFERRED EMBODIMENTS

An embodiment of the present invention will now be described with reference to FIGS. 1 to 8. FIG. 1 illustrates a focus detection optical system portion. When the focus detection optical system is installed in a single reflex camera, a focusing lens is assumed to be arranged in front of the optical system.

Figure 3A:
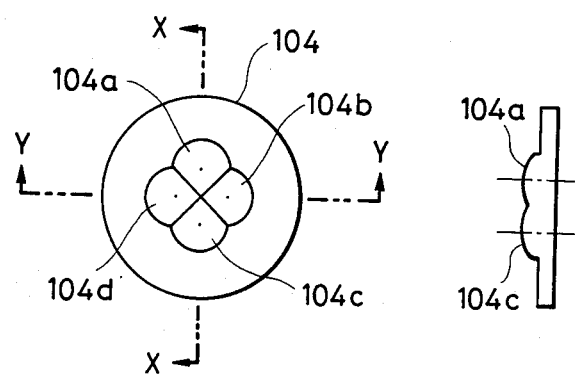
FIGS. 3A to 3C are detailed views of a secondary focusing lens body.
Figure 3B:
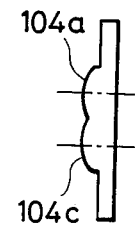
Figure 3C:
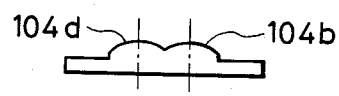

The optical system includes a field mask 101 having a cross-shaped slit, a field lens 102, a multi aperture stop 103, a secondary focusing lens body 104 which is, for example, integrally formed, and a one-chip photoelectric conversion device 105 having four pixel arrays. The imaging system in FIG. 1 has an optical axis X. The field mask 101, is located near a prospective focusing plane (not shown) of an imaging lens (not shown), and the secondary focusing lens body 104 re-focuses a spatial image focused by the imaging lens on pixel arrays 105a to 105d of the photoelectric conversion device 105. The multi aperture stop 103 has vertically aligned apertures 103a and 103c and horizontally aligned apertures 103b and 103d (FIG. 2), and the secondary focusing lens body 104 has vertically aligned positive lens portions 104a and 104c and horizontally aligned positive lens portions 104b and 104d in correspondence therewith (FIG. 3). For this reason, the spatial image in the slit of the field mask 101 is divided into four images having a parallex and is re-focused on the photoelectric conversion device 105. In the secondary focusing lens body 104 shown in FIG. 3, the vertically and horizontally aligned positive lens portion pairs 104a and 104c, and 104b and 104d are coupled so that the distances between their optical axes are smaller than their diameters as if they were bonded after the edges of the lenses are cut off. This lens structure helps to increase the amount of effective light. The positive lens portion pairs 104a and 104c, and 104b and 104d have the same focusing magnification.

Figure 4:
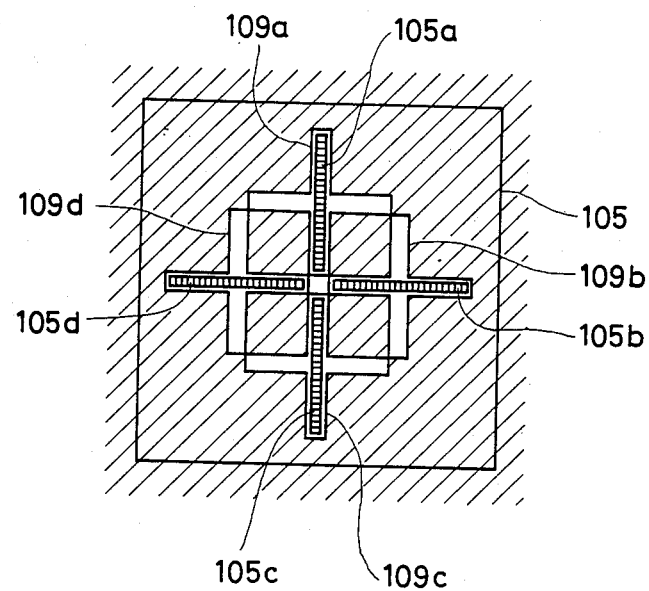
FIG. 4 is a view of a field mask image on a photoelectric conversion device.

A light beam incident on the stop aperture 103a through the field mask 101 and the field lens 102 then becomes incident on the lens portion 104a of the lens body 104, and forms an illuminated area as a field mask image 109a on the photoelectric conversion device 105, as shown in FIG. 4. The pixel array 105a is located inside the field mask image 109a, and the light distribution of the object image is thereby extracted as an electrical signal. Similarly, the light beam transmitted through the stop aperture 103b and the lens portion 104b forms a field mask image 109b, the light beam transmitted through the stop aperture 103c and the lens portion 104c forms a field mask image 109c, and the light beam transmitted through the stop aperture 103d and the lens portion 104d forms a field mask image 109d, respectively. The light distribution of the object image is photoelectric converted by the pixel arrays 105a, 105b, 105c, and 105d.

Figure 6:
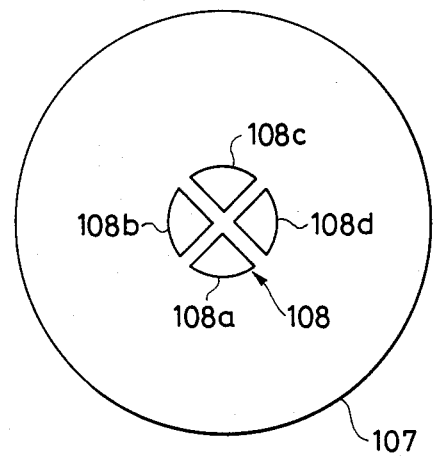
FIG. 6 is a view of a pupil division state of an objective lens.

FIGS. 5A and 5B are sectional views showing this optical effect. Referring to FIGS. 5A and 5B, the field mask 103 is arranged adjacent to the primary focusing plate of the imaging lens 106, and the field lens 102 is arranged to project the multi aperture stop 103 onto an exit pupil of the imaging lens 106. Therefore, as shown in FIG. 6, the field mask images 109a, 109b, 109c, and 109d are formed by the light beams transmitted through four separated regions 108a, 108b, 108c, and 108d on the exit pupil 107. More specifically, a focus detection optical system of a phase difference detection type is provided for each light beam passing through the regions 108a, 108b, 108c, and 108d on the exit pupil 107.

Figure 7A:
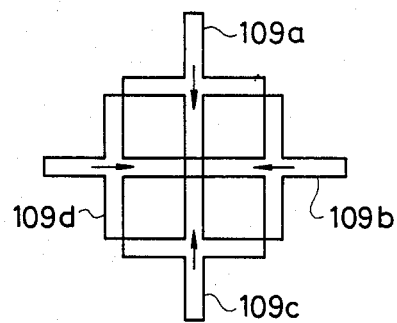
FIGS. 7A and 7B are views showing moving directions of a light distribution in the field mask image.
Figure 7B:
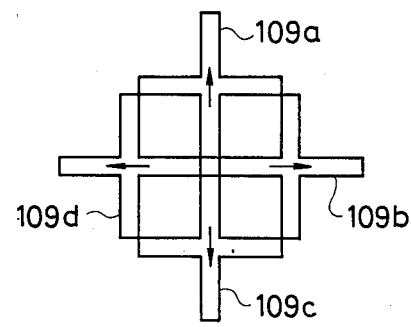

In a near-in-focus state wherein a substance in front of the object forms an image on the prospective focusing plane, the light distributions of the image in the field mask images 109a to 109d are displaced from the just-in-focus state in the directions indicated by arrows, as shown in FIG. 7A. Conversely, in a far-in-focus state wherein a substance behind the object forms an image on the prospective focusing plane, the light distributions are displaced from the just-in-focus state in the directions indicated by arrows, as shown in FIG. 7B.

Figure 8A:
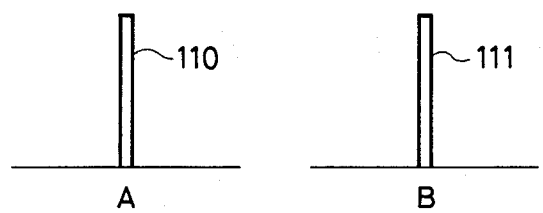
FIGS. 8A to 8C are views showing sensor outputs corresponding to a focusing state of the objective lens.
Figure 8B:
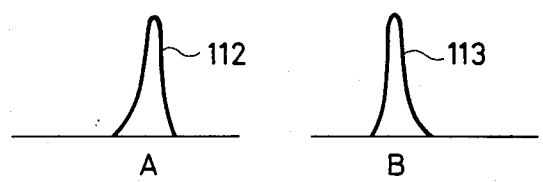
Figure 8C:
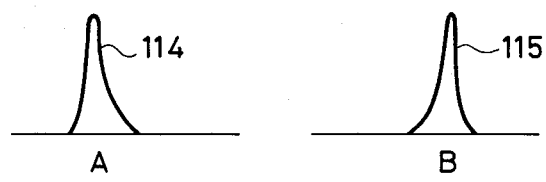

FIGS. 8A to 8C show photoelectric conversion outputs in the near-in-focus and far-in-focus states, which are photoelectric conversion outputs from the pixel arrays 105a, 105b, 105c, and 105d when a point image is formed at the center of the field mask 101 by the imaging lens. The photoelectric conversion outputs from the pixel arrays 105a and 105b correspond to an A system column, and the photoelectric conversion outputs from the pixel arrays 105c and 105d correspond to a B system column. FIG. 8A shows photoelectric conversion outputs when the imaging lens is at the just-in-focus position, FIG. 8B shows photoelectric conversion outputs when the imaging lens is at the near-in-focus position, and FIG. 8C shows photoelectric conversion outputs when the imaging lens is at the far-in-focus position. A distance between two images is reduced in the near-in-focus position, and is increased in the far-in-focus position. When the relative distance between the two images is detected, a defocusing amount of the imaging lens can be calculated. Although a calculation method thereof will be briefly described later, since a detailed description thereof is out of the scope of the present invention, it will be omitted.

FIGS. 9 to 12 show another embodiment of the present invention. As shown in FIG. 9, a focus detection apparatus of this embodiment includes a field mask 116 with a square opening whose diagonal lines coincide with each other in the vertical and horizontal directions, a field lens 112, a multi aperture stop 117, a secondary focusing lens body 118, and a photoelectric conversion device 119 having vertically and horizontally aligned pixel arrays. In this embodiment, an imaging lens is arranged in front of this system. The stop 117 has four point-symmetrical apertures 117a, 117b, 117c, and 117d (FIG. 10), and the secondary focusing lens body 118 has four lens portions 118a, 118b, 118c, and 118d and aberration correction prism portions 118e, 118f, 118g, and 118h in correspondence therewith. More specifically, a light beam incident on the stop aperture 118a becomes incident on the lens portion 118a, emerges from the prism portion 118e, and then forms an image of a field mask 116 on the photoelectric conversion device 119. The pixel array 119a is located inside a field mask image 125a, the pixel array 119b is located inside a field mask image 125b, the pixel array 119c is located inside a field mask image 125c, and the pixel array 119d is located inside a field mask image 125d, respectively. The light distribution of the object image is extracted as an electrical signal.

Figures 10A, 10B, 10D:
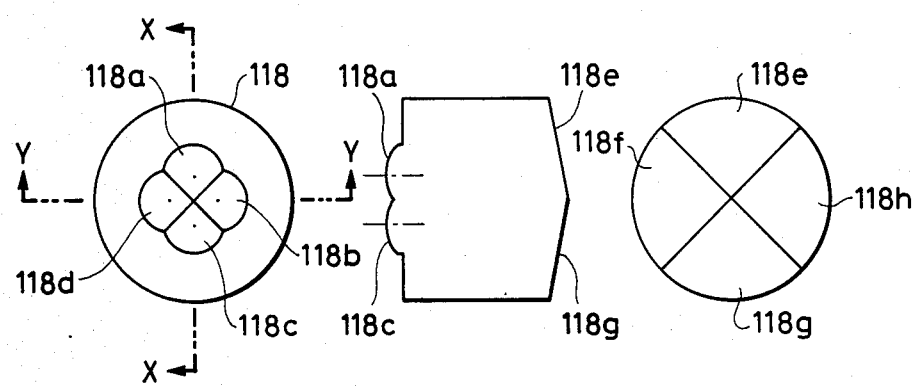
FIGS. 10A to 10D are detailed views of a secondary focusing lens body.
Figure 10C:
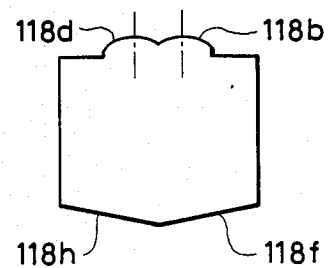

FIG. 10 illustrates the secondary focusing lens body 118 in detail. The concave lens portion pairs 118a and 118c, and 118b and 118d are combined so that the distances between their optical axes are smaller than the diameters of the respective lenses. In addition, correction prism portion pairs 118e and 118g, and 118f and 118h which are symmetrical in the horizontal and vertical directions and are inclined toward the pixel arrays are formed on the exit end of the columnar body. The correction prism eliminates an aberration, e.g., a distortion generated in separated images, for example, since a position at which the lens portion 118a views the object is different from that at which the lens portion 118c views the object. The exit surfaces are inclined to have the optical axis positions of the respective lens portions as the centers, thus achieving the above object. This technique is proposed in U.S. patent application Ser. No. 877,850 filed June 24, 1986. Therefore, even if an object image becomes incident at any position in a focus detection field, the same just-in-focus position can be obtained.

FIG. 11 shows the stop in detail. The aperture portions of the stop have a shape for maximizing the symmetry of a blurred image and the base length of the focus system. More specifically, blurred images formed by the stop shown in FIG. 2 are as shown in FIGS. 8B and 8C, and the two images are incongruous. This is caused since the stop apertures 103a and 103c cannot overlap with each other although one of them is parallel-shifted. This also applies to the apertures 103b and 103d. When the stop has the shape shown in FIG. 2, the two pairs of the apertures have the relationship of a mirror image. For this reason, the blurred images also have the relationship of the mirror image, and cannot overlap with each other by parallel movement. In contrast to this, in the stop shape combining two arcs shown in FIG. 11, if the aperture 117a is parallel-shifted, it overlaps the aperture 117c, and if the aperture 117b is parallel-shifted, it overlaps the aperture 117d. Therefore, the blurred images have a congruous shape, as shown in FIG. 13, and can overlap with each other by parallel movement of one blurred image. As a result, phase difference detection between two images can be performed with high precision.

Under the above-mentioned conditions, in order to maximize the base length of the focus detection system, the stop has a circular shape so that the maximum diameters of the four apertures correspond to the exit pupil shape of the imaging lens.

In order to effectively utilize the amount of light, the stop can have square apertures, as shown in FIG. 14.

In the stop shapes shown in FIGS. 2, 11, and 14, the barycentric distances of the corresponding stop aperture pairs are set to be equal to each other, so that the respective focus detection optical systems have the same base length. More specifically, the horizontal and vertical barycentric distances of the aperture pairs 103a–103c and 103b–103d shown in FIG. 2, the bi-concave aperture pairs 117a–117c and 117b–117d shown in FIG. 11, and the parallelogram aperture pairs 136a–136c and 136b–136d shown in FIG. 14 are equal to each other. With this structure, the relative displacement of the light distribution in the field mask image shown in FIG. 7 with respect to defocusing of an objective lens is equal to each other in field mask images 109a–109c and 109b–109d.

Figure 12:
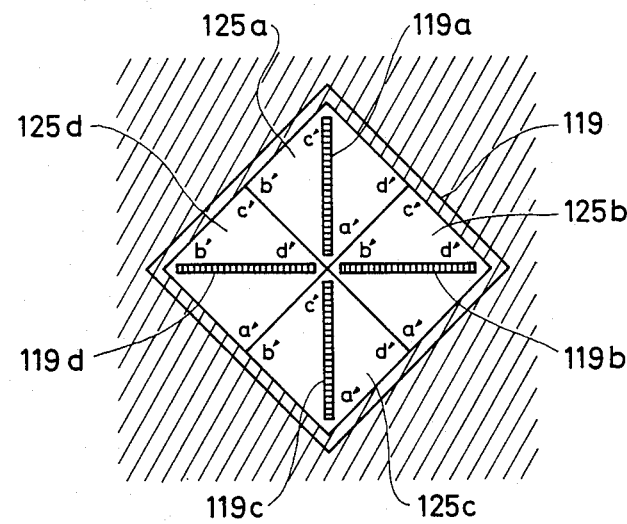
FIG. 12 is a view of a field mask image on a photoelectric conversion device.

FIG. 12 illustrates a state of a field mask image on the photoelectric conversion device in the focus detection optical system shown in FIG. 9. The field mask is divided into four images by the secondary focusing lens body 118 having four lens portions and is projected on the photoelectric conversion device. Points a, b, c, and d within the field mask slit shown in FIG. 9 correspond to a′, b′, c′, and d′ in FIG. 12.

Referring to FIG. 9, the object image is formed near the field mask 116 by the imaging lens (not shown), and a light beam passing through the slit of the field mask 116 passes through the multi aperture stop 117 and is focused on the photoelectric conversion device 119 by the secondary focusing lens 118 as two pairs of images having a parallax. In this case, in the same manner as in FIG. 5A, the light beam passing through the aperture 117a of the multi aperture stop 117 is subjected to a focus effect by the positive lens portion 118a, and after being subjected to an aberration correction effect of the prism portion 118e, forms an image on the pixel array 119a. The light beam passing through the aperture 117c is subjected to the focus effect of the positive lens portion 118c and the aberration correction effect of the prism portion 118g and, thereafter, forms an image on the prism array 119c. The separated images on the pixel arrays 119a and 119c symmetrically move in the vertical direction upon focusing of the imaging lens (not shown) in the same manner as in FIG. 7. The light beams passing through the apertures 117b and 117d of the multi aperture stop 117 form images on the pixel arrays 119b and 119d, respectively, and these images symmetrically move in the horizontal direction upon focusing of the imaging lens.

The defocusing amount of the imaging lens can be calculated from the phase difference of the images projected on the pixel arrays of the photoelectric conversion device as follows.

If d is a defocusing amount of the imaging lens, Z is a relative displacement between two images, M is a focusing magnification of a secondary focusing system, Fo is an F number representing an angle formed by the optical axis of the imaging lens and a light beam passing through the center of the divided pupil portions of the exit pupil, and g is a distance between a film surface and an imaging lens exit pupil surface, the following relation is established:

$$d = (Fo/M)Z/\{1 + FoZ/(Mg)\} \quad (1)$$

The defocusing amount of the imaging lens can be calculated from the relative displacement Z between the two images. The relative displacement Z between the two images can be calculated by a method disclosed in Japanese Patent Disclosure No. 142306/1983.

Since the vertical and horizontal defocusing amounts will substantially coincide with each other, the imaging lens is driven in accordance with the calculated amounts. However, it is sometimes impossible to calculate one defocusing amount due to the outer appearance or pattern of an object. In this case, the position of the imaging lens is adjusted using a calculated value.

Even though the calculated vertical and horizontal values do not coincide with each other, since the smaller value can be adopted or a value having a higher contrast value obtained during calculation can be adopted, the adjustment reliability can be improved.

Figure 15A:
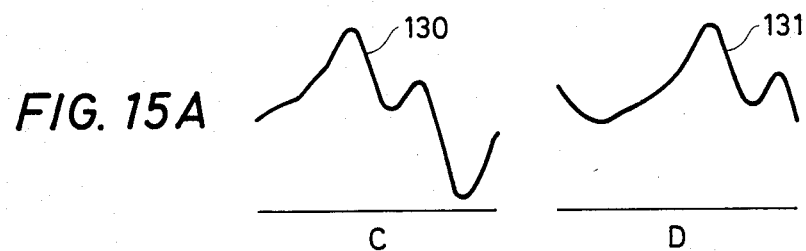
FIGS. 15A to 15C are views showing sums of pixel array outputs.
Figure 15B:
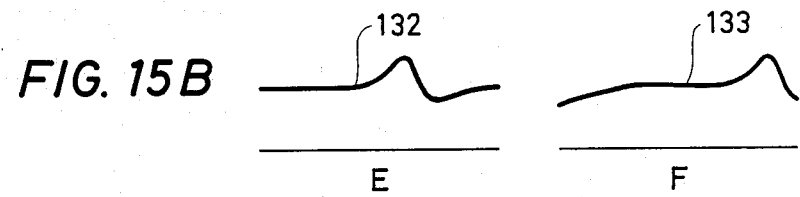
Figure 15C:
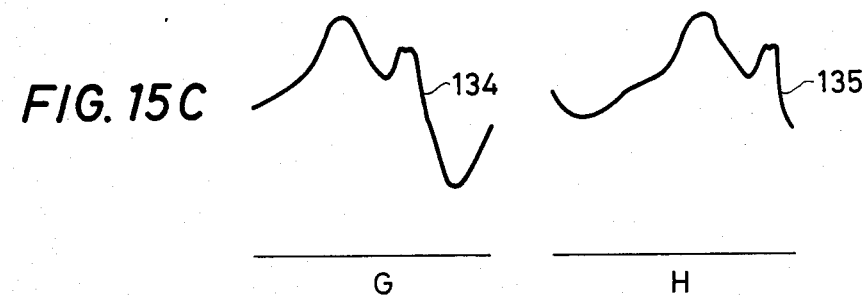

Alternatively, after the outputs from the two pairs of vertical and horizontal pixel arrays are added, the displacement Z can be calculated. FIG. 15 is a view for explaining this displacement detection method. In FIG. 15, the pixel array outputs are indicated by 130 to 135, and FIG. 15(a)-C corresponds to output of the pixel array 105a, FIG. 15(a)-D corresponds to the output of the array 105c, FIG. 15(b)-E corresponds to the output of the array 105b, and FIG. 15(b)-F corresponds to the output of the array 105d. FIG. 15C illustrates sums of the outputs shown in FIGS. 15A and 15B, in which FIG. 15(c)-G corresponds to a sum of the sensor outputs 130 and 132 and FIG. 15(c)-H corresponds to a sum of sensor outputs 131 and 133. When the relative image displacement is obtained from the synthetic sensor outputs 134 and 135 with the above method, the defocusing amount of the imaging lens can be calculated. With this processing, even if an image on the pixel arrays has a low contrast and the image displacement cannot be accurately detected only by this pixel array output, if an image having a high contrast is formed on the other pixel arrays, the synthetic output of the pixel arrays can have a high contrast as shown in FIG. 15C. As a result, the image displacement can be detected with high precision by a single calculation. In particular, this is effective when an image having no contrast, e.g., an object image having a stripe pattern is projected on one pair of the pixel arrays.

Figure 16A:
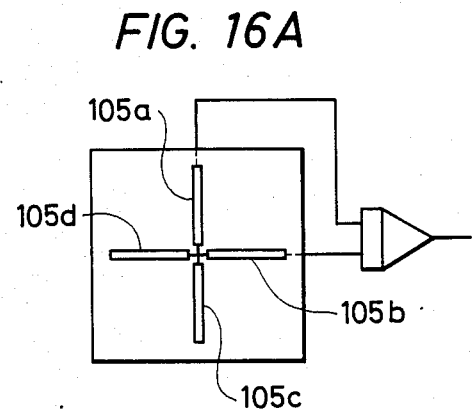
FIG. 16A is an output circuit diagram of a photoelectric conversion device.

In order to synthesize the signals described above, output signals from an M system column consisting of the pixel arrays 105a and 105c and from an N system column consisting of the pixel arrays 105b and 105d can be simply added by an adder as shown in FIG. 16A, or they can be calculated in the device.

Figure 16B:
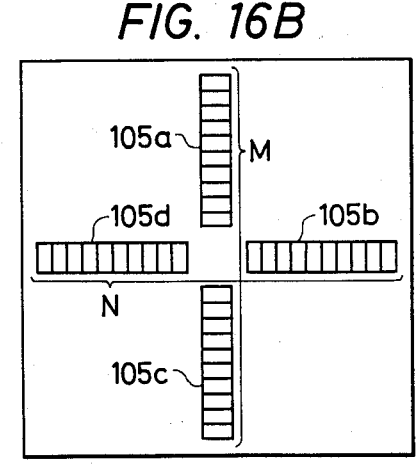
FIG. 16B is a front view of the photoelectric conversion device.
Figure 17:
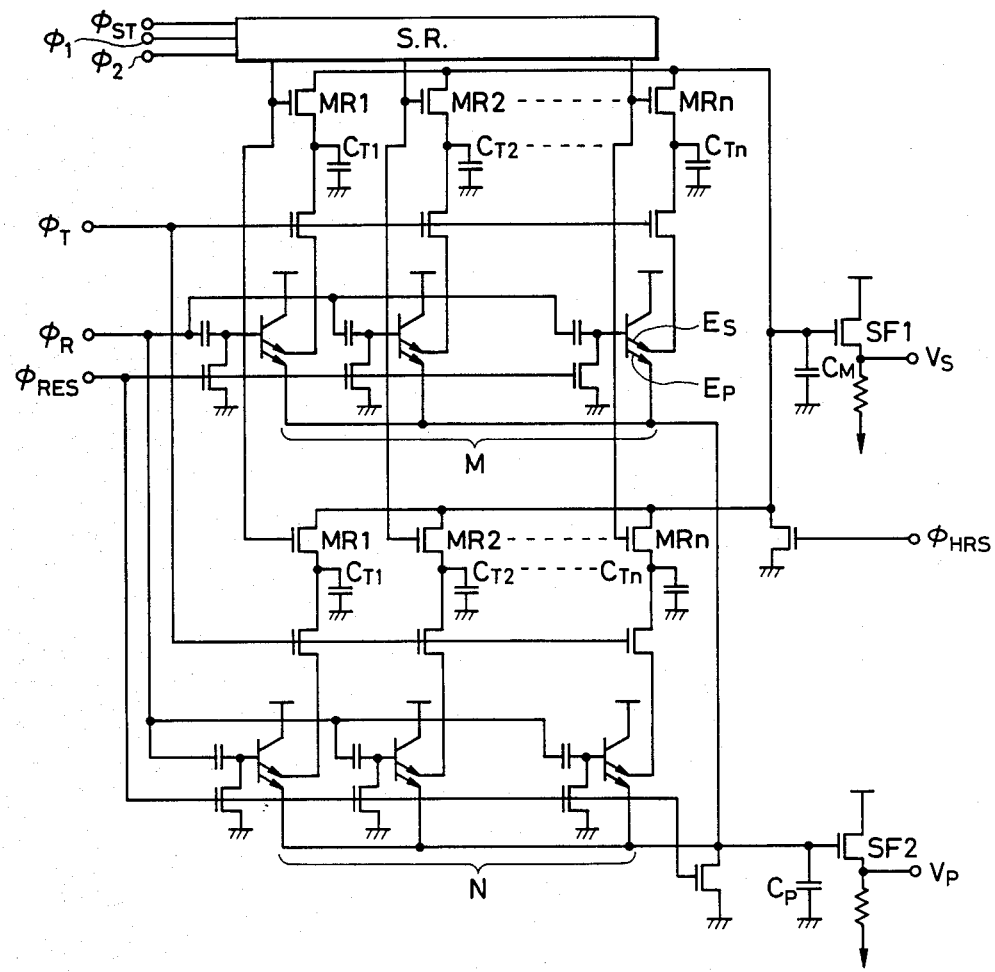
FIG. 17 is a circuit diagram of an equivalent circuit provided to the photoelectric conversion device.
Figure 18:
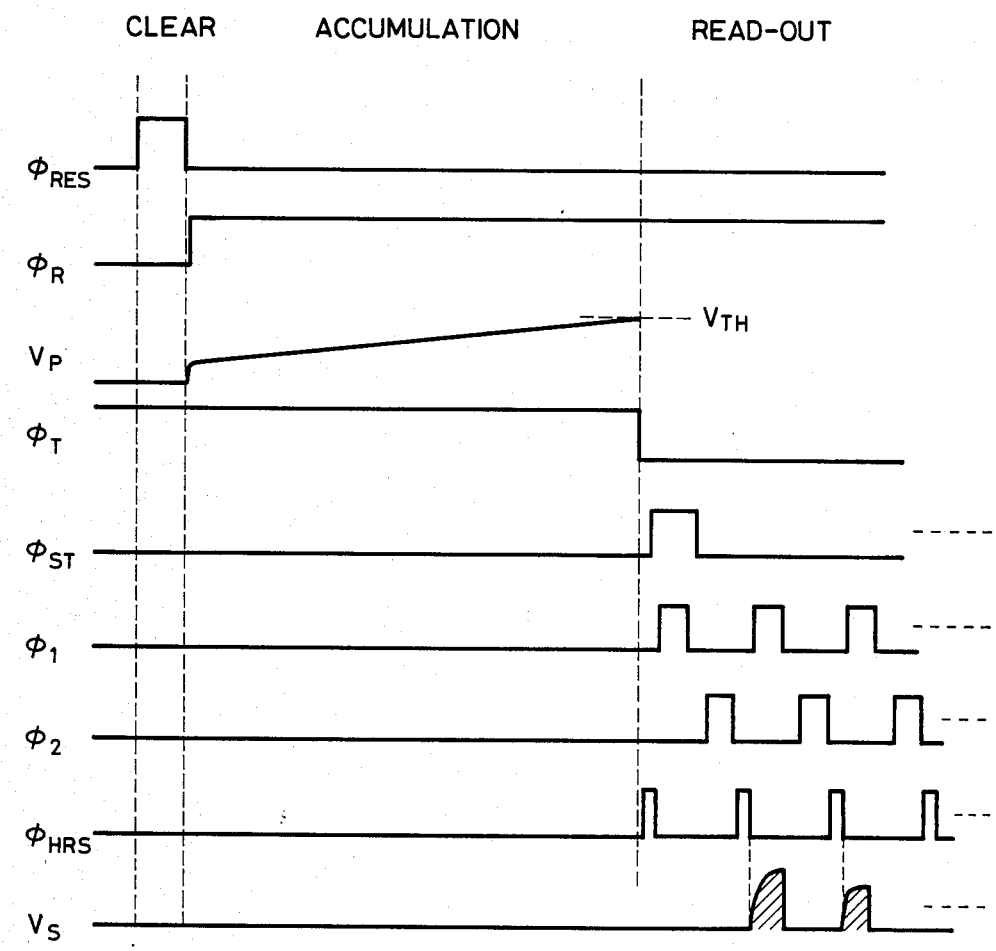
FIG. 18 is a timing chart of respective signals in the circuit shown in FIG. 17.

This addition is performed by an equivalent circuit shown in FIG. 17 provided to the photoelectric conversion devices 105 and 119. M and N in FIG. 17 correspond to M and N in FIG. 16B. Note that FIG. 18 shows the timing chart of this operation.

The equivalent circuit is arranged based on an accumulation type image sensor, but can comprise a CCD or MOS structure. All MOS transistors in this circuit are n-channel transistors, and in view of the timing chart, a High-level period corresponds to an ON state, and Low-level period corresponds to an OFF state. During a clear period, a control signal φRES is set at High level, thus clearing accumulated charges. When the control signal φRES is set at High level, the base potential is fixed at a potential GND and, simultaneously, a wiring equivalent capacitance Cp is also fixed at the potential GND, thus performing a clear operation. When the control signal φRES is set at Low level to enter an accumulation period, a signal φR goes to High level and the base potential is forward biased with respect to the emitter. At this time, when the forward bias voltage is controlled to exceed a voltage VBe, a voltage corresponding to a maximum accumulation value of the pixel array is charged, and a potential corresponding to the maximum value appears at an output VP through a source follower SF$_2$. The maximum value output VP increases while light becomes incident on the pixel arrays, and the output VP is monitored to control the accumulation period. At the same time, emitter potentials of the respective pixel arrays are charged on capacitors CT since the signal $\phi$T is controlled to be High level. When the output VP has reached a threshold level VTH, the signal $\phi$T is set at Low level, and the capacitors CT are disconnected from an emitter signal Es, thus stopping the charging of the capacitors CT. In this manner, the accumulation period ends. The charges accumulated on the capacitors CT corresponding to the respective pixels are signal outputs of the respective pixels. Then, a shift register SR is operated to read out the signal outputs. The shift register SR is a dynamic resister, and has start pulses $\phi$ST and clocks $\phi$1 and $\phi$2. During the High level period of the pulse $\phi$1, a MOS transistor MRn is kept ON, and the charge on the capacitor CT can be read out through an equivalent wiring capacitance CH by capacitance division. More specifically, when the pulse $\phi$ST goes to High level in FIG. 18, the shift register SR is cleared, and in response to the clocks $\phi$1 and $\phi$2, the transistors MR1 to MRn are sequentially turned on to read out the signal outputs charged on the capacitors CT. During this interval, a pulse $\phi$HRS goes to High level immediately after the clock $\phi$1 goes to High level, and the equivalent wiring capacitance CH is fixed at the potential GND and is cleared.

In the present invention, the MOS transistors MR1 to MRn of the M and N systems of the pixel arrays 105a, 105b, 105c, and 105d, or 119a, 119b, 119c, and 119d are simultaneously turned on by the shift register SR, and the signal outputs of the pixel arrays 105a and 105d, and 105b and 105c, or 119a and 119d, and 119b and 119c are read out and added at the same time. More specifically when a potential charged on a capacitor CT1 of the M system of the pixel arrays is given by V1 and potential charged on a capacitor CT1 of the N system of the pixel arrays is given by V2, a potential at the equivalent wiring capacitance CH when the MOS transistor MR1 is turned on is given by:

$$\{CT/(CH+2CT)\}(V1+V2)$$

and, the potential proportional to (V1+V2) is obtained at VS.

Figure 19B:
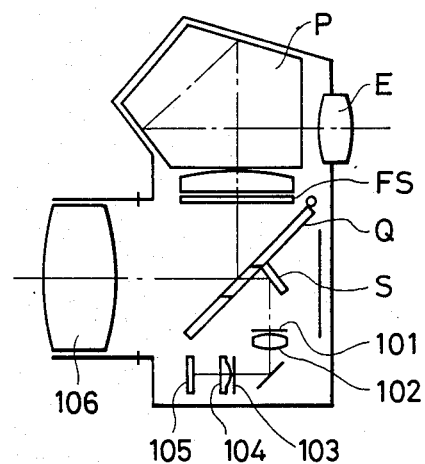
FIG. 19B is a sectional view showing an optical system of the camera.
Figure 19A:
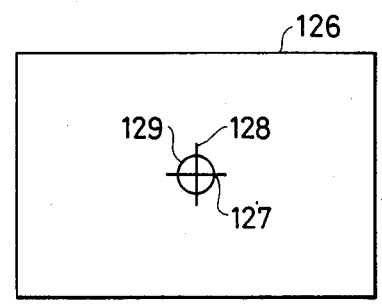
FIG. 19A is a view showing a finder field and a distance measurement section when the focus detection apparatus of the present invention is applied to a camera.

FIG. 19A illustrates a position of a distance measurement field in a finder field of a camera. Referring to FIG. 19A, a finder field 126 includes distance measurement fields 127 and 128, and a distance measurement portion indication mark 129 indicating a portion at which the fields 127 and 128 overlap each other. The mark 129 is printed on a focus plate FS of a camera shown in FIG. 19B. Note that marks indicating distance measurement fields can also be printed on the focus plate FS. FIG. 19B shows an optical system of a single reflex camera. In FIG. 19B, a light beam transmitted through a quick-return mirror Q is reflected by a sub mirror S and propagates toward a focus detection apparatus, and the light reflected thereby propagates toward an eye piece E through the focus plate FS and a pentagonal prism P.

The field mask 101 and the focus plate FS are optically equivalent to each other with respect to a mirror surface of the quick-return mirror Q. Therefore, the photoelectric conversion device 105 is optically equivalent to the focus plate FS. The marks 127 and 128 correspond to the cross-shaped slit of the field mask 101 and further correspond to the pixel arrays 105a to 105d. Therefore, when an object image overlaps the distance measurement field 127, the object image is re-focused on the photoelectric conversion pixel arrays 105b and 105d or 119b and 119d, and the object image incident on the distance measurement field 128 is refocused on the photoelectric conversion pixel arrays 105a and 105c or 119a and 119c.

Figure 20:
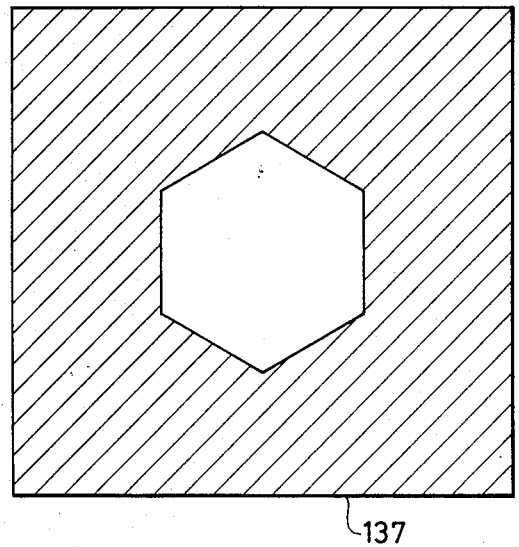
FIG. 20 is a plan view of a field mask used when three focus detection optical systems are combined.
Figure 21:
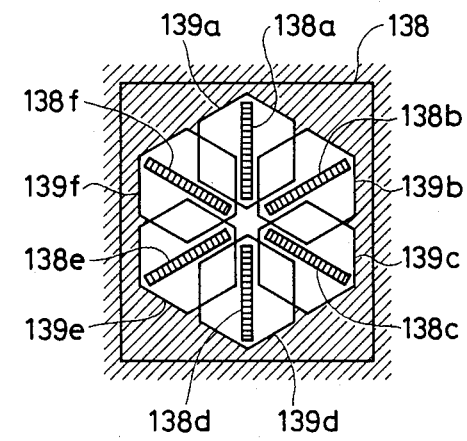
FIG. 21 is a view showing a field mask image on the photoelectric conversion device.

In the above descriptions, the case has been exemplified wherein two sets of focus detection optical systems are provided. The present invention can be realized by three sets or more of focus detection optical systems. FIGS. 20 and 21 show a case wherein three sets of focus detection optical systems are combined. FIG. 20 shows a field mask, and FIG. 21 shows a field mask image on a photoelectric conversion device. A secondary focusing lens body having six lens portions arranged on the circumference at equal intervals can be used, and a detailed description thereof is omitted. A focus detection apparatus shown in FIGS. 20 and 21 includes a field mask 137, and a photoelectric conversion device 138 having pixel arrays 138a to 138f arranged thereon. The pixel arrays 138a to 138f are located inside field mask images 139a to 139f shown in FIG. 21, and convert a light distribution into electrical outputs. In this case, distances between sensors and distances between field mask images are determined so that the field mask images do not overlap adjacent pixel arrays. For example, only the pixel array 138a is located inside the field mask image 139a, and is separated apart from the pixel arrays 138b and 138f so as not to receive excess light. Theoretically, the distances between the sensors can be sufficiently widened as compared to the sizes of the field mask images by reducing the F number of an effective light beam for focus detection optical systems in an objective lens or by reducing an image magnification of a secondary focusing system. However, when the focus detection apparatus of the present invention is applied to a camera and the like, the F number of the effective light beam of the focus detection optical systems is small, e.g., F8, and the secondary focusing magnification preferably falls within the range of −0.2 to −0.5. If these values are further reduced, this poses problems of the manufacture of the photoelectric device, of assembly or adjustment of the focus detection device.

As described above, since focus detection is enabled based on the light distributions in a plurality of directions of an object, a sweater having a lateral stripe pattern or a blind for a window whose focus detection cannot be performed by a conventional passive type focus detection apparatus can be focused, thus eliminating objects which are hard to focus. A photographic opportunity will not be lost due to inaccurate focusing, or due to a cumbersome focusing operation, such as temporarily obtaining a focus on another position of an object, and then returning to the target position.

Since double focus detection is performed, a focusing position can be detected with respect to substantially the same detection field, thus improving detection precision.

If changes in distances between images due to defocusing of an imaging lens described above are set to be equal to each other, the F number Fo can be considered as a constant in the relation of the defocusing amount, thus allowing easy calculation.

After the outputs of the sensor pairs are added and the signals 134 and 135 are prepared by adding the signals 130 and 132, and signals 131 and 133, the image displacement calculation can be performed to detect the defocusing amount of the objective lens, thus advantageously requiring only a single image displacement calculation.

What is claimed is:

1. A focus detection apparatus for an objective lens, comprising:
   first optical means for forming energy distributions which vary along a first direction in accordance with a focusing state of said objective lens;
   second optical means for forming energy distributions which vary along a second direction transverse to the first direction in accordance with the focusing state of said objective lens;
   first sensing means, having a plurality of photosensors, for forming a signal associated with the focusing state of said objective lens in order to sense the energy distributions formed by said first optical means;
   second sensing means, having a plurality of photosensors, for forming a signal associated with the focusing state of said objective lens in order to sense the energy distributions formed by said second optical means; and
   a stop having a first aperture for regulating a detection field for said first sensing means and a second aperture for regulating a detection field for said second sensing means, said stop being arranged between said first and second optical means and said objective lens;
   said first and second optical means being provided between a predetermined image plane of the objective lens and said first and second sensing means, each of said first and second optical means having a pair of light regulating members and a pair of image forming lenses.

2. An apparatus according to claim 1, wherein said light regulating members of said first optical means and those of said second optical means comprise a multi aperture stop.

3. An apparatus according to claim 2, wherein pairs of apertures of said multi aperture stop are arranged to sandwich an optical axis of said objective lens therebetween, and said pairs of apertures have shapes to overlap each other when they are parallel-shifted.

4. An apparatus according to claim 3, wherein each of apertures has a shape combining two arcs.

5. An apparatus according to claim 3, wherein the each of the apertures has a parallelogram shape.

6. An apparatus according to claim 3, wherein barycentric distances of the apertures facing each other to sandwich the optical axis therebetween are equal to each other.

7. An apparatus according to claim 1, wherein said pairs of image forming lenses for said first and second optical means are arranged to be symmetrical with each other about the optical axis of said objective lens.

8. An apparatus according to claim 1, wherein said image forming lenses are integrally formed.

9. An apparatus according to claim 1, wherein said first and second sensing means are integrally arranged to comprise a single device.

10. An apparatus according to claim 9, wherein the signal from said first sensing means and that from said second sensing means are electrically added by addition means.

11. An apparatus according to claim 10, wherein said addition means is arranged in the device integrating said first and second sensing means.

12. An apparatus according to claim 1, wherein the variation of the energy distributions of said first optical means and that of said second optical means are equal to each other with respect to a unit defocusing amount of said objective lens.

13. An apparatus according to claim 1, wherein each of said first and second optical means has a pair of apertures, and barycentric distances of said apertures are equal to each other.

14. An apparatus according to claim 1, wherein the first aperture extends horizontally, and the second aperture extends vertically.

15. An apparatus according to claim 14, wherein the first and second apertures overlap each other at the center thereof.

16. An apparatus according to claim 15, wherein the first and second apertures form a cross shape.

17. An apparatus according to claim 15, wherein the first and second apertures form a square, whose diagonal lines coincide vertical and horizontal directions.

18. An apparatus according to claim 1, further comprising:
   third optical means for forming energy distributions which vary along a third direction different from said first and second directions in accordance with the focusing state of said objective lens; and
   third sensing means, having a plurality of sensors, for forming a signal associated with the focusing state of said objective lens in order to sense the energy distributions formed by said third optical means.

19. A focus detection apparatus having distribution forming optical means for forming energy distributions associated with an object image from a light beam passing through an objective lens, the distributions varying in accordance with a focusing state of said objective lens, and photoelectric conversion means for forming a signal indicating the focusing state of said objective lens, comprising:
   a plurality of said distribution forming optical means and said photoelectric conversion means arranged so that directions, along which the energy distributions vary, are different and transverse to each other, and said distribution forming optical means is provided between a predetermined image plane of the objective lens and said photoelectric conversion means; and
   a field stop and a field lens, arranged adjacent to a prospective focusing plane of said objective lens, for regulating a detection field.

20. An apparatus according to claim 19, wherein said distribution forming optical means has a pair of positive lenses arranged to sandwich an optical axis of said objective lens therebetween, and a stop having a pair of apertures.

21. An apparatus according to claim 20, wherein the pair of apertures have a shape to overlap each other when one of them is parallel-shifted.

22. An apparatus according to claim 19, wherein said field stop has a single aperture.

23. An apparatus according to claim 22, wherein the aperture has a cross shape.

24. An apparatus according to claim 22, wherein the aperture has a square shape.

25. An apparatus according to claim 19, wherein the signals of said plurality of photoelectric conversion means are added and, thereafter, are subjected to signal processing.

26. An apparatus according to claim 19, wherein said plurality of photoelectric conversion means are arranged on a single chip, and said chip comprises means for adding the signals from said photoelectric conversion means.

27. An apparatus according to claim 19, wherein each of said photoelectric conversion means has a photosensor array, and the respective photosensor arrays cross at the center thereof.

28. A focus detection apparatus for an objective lens, comprising:
   first optical means for forming energy distributions which vary along a first direction in accordance with a focusing state of said objective lens;
   second optical means for forming energy distributions which vary along a second direction transverse to the first direction in a with the focusing state of said objective lens;
   first sensing means, having a plurality of photosensors, for forming a signal associated with the state of said objective lens in order to sense the distributions formed by said first optical means;
   second sensing means, having a plurality of photosensors, for forming a signal associated with the focusing state of said objective lens in order to sense the energy distributions formed by said second optical means; and
   a stop having a first aperture for regulating a detection field for said first sensing means and a second aperture for regulating a detection field for said second sensing means, said stop being arranged between said first and second optical means and said objective lens.

29. An apparatus according to claim 28, wherein the first aperture extends horizontally, and the second aperture extends vertically.

30. An apparatus according to claim 29, wherein the first and second apertures overlap each other at the center thereof.

31. An apparatus according to claim 30, wherein the first and second apertures form a cross shape.

32. An apparatus according to claim 30, wherein the first and second apertures form a square, whose diagonal lines coincide in vertical and horizontal directions.

33. An apparatus according to claim 32, further comprising a positive lens provided between said first and second optical means and said objective lens.

34. A focus detection apparatus having distribution forming optical means for forming energy distributions associated with an object image from a light beam passing through an objective lens, the distributions varying in accordance with a focusing state of said objective lens, comprising:
   a plurality of said distribution forming optical means and said photoelectric conversion means arranged so that directions, along which the energy distributions vary, are different and transverse to each other; and
   a field stop and a field lens arranged adjacent to a predetermined image plane of said objective lens, for regulating a detection field.

* * * * *

UNITED STATES PATENT AND TRADEMARK OFFICE
CERTIFICATE OF CORRECTION

PATENT NO. : 4,859,842            Page 1 of 3
DATED : August 22, 1989
INVENTOR(S) : Suda, et al.

It is certified that error appears in the above-identified patent and that said Letters Patent is hereby corrected as shown below:

On the title page, item [57], ABSTRACT:

Line 19, change "distribution" to --distributions--.

COLUMN 2:

Line 31, change "multi aperture stop" to --multi-aperture stop--.

Line 41, change "multi aperture stop 103" to --multi-aperture stop 103--.

Line 49, change "parallex" to --parallax--.

COLUMN 3:

Line 12, change "mask 103" to --mask 101--.

Line 14, change "multi aperture stop 103" to --multi-aperture stop 103--.

Line 61, change "multi aperture stop 117" to --multi-aperture stop 117--.

COLUMN 4:

Line 4, change "118a" (first occurrence) to --117a--.

UNITED STATES PATENT AND TRADEMARK OFFICE
CERTIFICATE OF CORRECTION

PATENT NO. : 4,859,842                    Page 2 of 3
DATED     : August 22, 1989
INVENTOR(S) : Suda, et al.

It is certified that error appears in the above-identified patent and that said Letters Patent is hereby corrected as shown below:

COLUMN 5:

Line 22, change "multi aperture stop 117" to --multi-aperture stop 117--.

Line 25, change "parallex" to --parallax--.

Line 27, change "multi aperture stop 117" to --multi-aperture stop 117--.

Line 39, change "multi" to --multi- --.

COLUMN 6:

Line 14, change "output" to --the output--.

COLUMN 7:

Line 16, change "resister" to --register--.

COLUMN 9:

Line 40, change "multi" to --multi- --.

Line 43, change "multi aperture" to --multi-aperture--.

Line 49, change "apertures" to --the apertures--.

Line 50, delete "the".

UNITED STATES PATENT AND TRADEMARK OFFICE
CERTIFICATE OF CORRECTION

PATENT NO. : 4,859,842            Page 3 of 3
DATED : August 22, 1989
INVENTOR(S) : Suda, et al.

It is certified that error appears in the above-identified patent and that said Letters Patent is hereby corrected as shown below:

COLUMN 10:

Line 23, change "coincide vertical" to --coincide in vertically--.

COLUMN 11:

Line 19, change "a" to --accordance--.
    Line 22, insert --focusing-- before "state".
    Line 23, change "distribu-" to --energy distribu- --.

Signed and Sealed this

Second Day of October, 1990

*Attest:*

HARRY F. MANBECK, JR.

*Attesting Officer*      *Commissioner of Patents and Trademarks*